(12) United States Patent  (10) Patent No.: US 7,486,473 B2
Thorson et al.  (45) Date of Patent: Feb. 3, 2009

(54) UNIVERSAL HOUSING FOR HOLDING STORAGE DEVICES

(75) Inventors: Thomas A. Thorson, Colorado Springs, CO (US); Paddy E. Collins, Colorado Springs, CO (US)

(73) Assignee: Quantum Corporation, San Jose, CA (US)

( * ) Notice: Subject to any disclaimer, the term of this patent is extended or adjusted under 35 U.S.C. 154(b) by 317 days.

(21) Appl. No.: 11/105,883

(22) Filed: Apr. 13, 2005

(65) Prior Publication Data

US 2006/0231513 A1  Oct. 19, 2006

(51) Int. Cl.
*G11B 15/68* (2006.01)
(52) U.S. Cl. .................................... 360/92.1
(58) Field of Classification Search .......... None
See application file for complete search history.

(56) References Cited

U.S. PATENT DOCUMENTS

| | | | | |
|---|---|---|---|---|
| 3,735,989 | A * | 5/1973 | Dattilo ........................ | 360/93 |
| 5,692,623 | A * | 12/1997 | Todor et al. .................. | 360/94 |
| 5,936,795 | A * | 8/1999 | Theobald et al. ............. | 360/92 |
| 6,244,677 | B1 * | 6/2001 | Millhiser et al. ........... | 312/9.48 |
| 6,526,017 | B1 * | 2/2003 | Smith .................... | 369/178.01 |
| 6,771,457 | B2 * | 8/2004 | Flaherty et al. ............... | 360/92 |
| 7,006,319 | B2 * | 2/2006 | Christie et al. ................ | 360/71 |
| 7,019,940 | B2 * | 3/2006 | Smith et al. ................... | 360/92 |
| 2002/0006030 | A1 * | 1/2002 | Evanson et al. ............ | 361/724 |
| 2003/0058747 | A1 | 3/2003 | Smith et al. | |
| 2003/0146127 | A1 | 8/2003 | Morita | |
| 2004/0012878 | A1 | 1/2004 | Yamakawa et al. | |
| 2004/0190177 | A1 * | 9/2004 | Christie et al. ................ | 360/69 |

FOREIGN PATENT DOCUMENTS

EP  1235217  8/2002
GB  2352865  A *  2/2001

* cited by examiner

*Primary Examiner*—David D Davis
(74) *Attorney, Agent, or Firm*—Morrison & Foerster LLP

(57) ABSTRACT

A housing for receiving and securing storage devices of varying dimensions useful in automated library systems is provided. In one example, the housing has an interior space defined by a base and a perimeter wall extending along at least two sides of the base. A first arm is coupled to the perimeter wall, and at least a portion of the first arm is biased to extend into the interior space at a height above the base for allowing insertion of thinner storage devices without pushing on the arm. The first arm is configured to evacuate the interior space in response to a thicker storage device pushing on the first arm. Stand-offs or other length differentiating features may be disposed and sized to provide a common pick point among storage devices of different types insertable in the housing. Further examples include providing additional arms that may be configured similar to the first arm.

27 Claims, 7 Drawing Sheets

UNIVERSAL HOUSING FOR HOLDING STORAGE DEVICES

BACKGROUND OF THE INVENTION

1. Field

The present invention relates generally to housings for holding storage devices, and more particularly to housings for providing adaptability in holding differently sized storage devices.

2. Description of Related Art

Mass storage devices of various sorts (such as magnetic tape cartridges) have proven to be an efficient and effective medium for data storage in computer systems. Large computer systems may use numerous storage devices as well as a plurality of drives for inputting and outputting data to and from the storage devices in a timely manner. Such storage devices may be organized into libraries.

Libraries generally include a plurality of storage bins or slots for storing the storage devices. In automated libraries, a robotic picker mechanism may be used for manipulating the storage devices in the library. Libraries may also include one or more media drives. Automated libraries provide advantages including relatively rapid access time to the storage devices as well as modularity and scalability.

Different standards for and types of storage devices (such as tape cartridges) have developed over time. Storage device types may have sizes different from each other. The types sizes may vary in a length, a width and a height dimension, but more frequently vary in the length dimension and the height dimension. A need exists for a general solution providing an ability to use differently sized storage devices in an automated library system.

SUMMARY

In one aspect, a housing for holding storage devices is provided. The exemplary housing comprises a base with at least four sides and an inner base surface, and a perimeter wall extending from at least two sides of the base and terminating at a top edge. The perimeter wall has an inner perimeter surface, which with the inner base surface defines an interior space. The housing further comprises a first arm coupled to the perimeter wall. At least a portion of the first arm is biased to extend into the interior space at a predetermined height above the inner base surface and configured to evacuate the interior space in response to a storage device pushing on the first arm during insertion of the storage device into the housing.

The housing may further comprise a length differentiating feature extending from the perimeter wall at a rear side, the length differentiating feature sized and disposed to fit in one or more notches formed in a rear wall of the second type of storage device.

The housing may further comprise a first detent disposed on the perimeter wall for interfacing with a mating feature associated with the first type of storage device and for avoiding interaction with the storage device if the storage device is of the second type. The housing may also comprise a second detent disposed on the perimeter wall for interfacing with a mating feature associated with the second type of storage device and for avoiding interaction with the storage device if the storage device is of the first type. The first detent and/or the second detent may be further configured to function as length differentiating features, such that storage devices of the first type and of the second type are disposed at a common pick point.

Housings according to aspects of the invention may comprise shells having at least an open front portion, an interior length dimension, and an interior height dimension. The height dimension is sized for a height dimension of a first storage device type, and the length dimension is sized to dispose a storage device of the first storage device type at a pick point. The housing may further comprise a length differentiating feature disposed on the shell for disposing at the pick point a storage device having a length dimension smaller than a length dimension of the first storage device type. The housing may further comprise a first spring biased arm coupled to the shell for securing in the shell a storage device having a height dimension smaller than the height dimension of the first storage device type. The first spring biased arm may be rotatable.

Still further aspects of the invention include storage device library systems that comprise a first housing and a second housing, where each the first and the second housings are of an interchangeable housing type. The interchangeable housing type comprises a shell having an interior space with a length dimension and a height dimension. The length dimension and the height dimension are respectively sized for a length dimension and a height dimension of a first storage device type. The interchangeable housing type may further comprise a first arm coupled to the shell and biased to dispose at least a portion of the first arm in the interior space at a height above a base of the shell. The height is selected to secure in the shell a storage device having a height dimension smaller than the height dimension of the first storage device type. The first arm is evacuable from the interior space in response to a storage device of the first storage device type pushing on the first arm while being inserted in the shell. The first arm may evacuate the interior space by rotating from the interior space.

Further aspects may include providing a second arm disposed and operable substantially as the first arm. Still further aspects include providing arms at other heights to accommodate still further storage device varieties.

DETAILED DESCRIPTION OF THE INVENTION

Exemplary systems and methods described herein relate generally to storage and manipulation of storage devices that may be contained in automated storage device library systems, and other systems and components such as media drives (for reading/writing data), magazines (for portable storage), fixed slots (for non-portable storage), and a transport station (for transporting storage devices to another library device such as an elevator or the like).

The following description is presented to enable a person of ordinary skill in the art to make and use various aspects of such invention. Descriptions of specific materials, techniques, and applications are provided as examples. Various modifications to the examples described herein will be readily apparent to those of ordinary skill in the art, and the general principles defined herein may be applied to other examples and applications without departing from the spirit and scope of the invention. Thus, the scope of embodiments of the invention is not intended to be limited to the examples described and shown, but rather by reference to the claims appended hereto.

Figure 1:
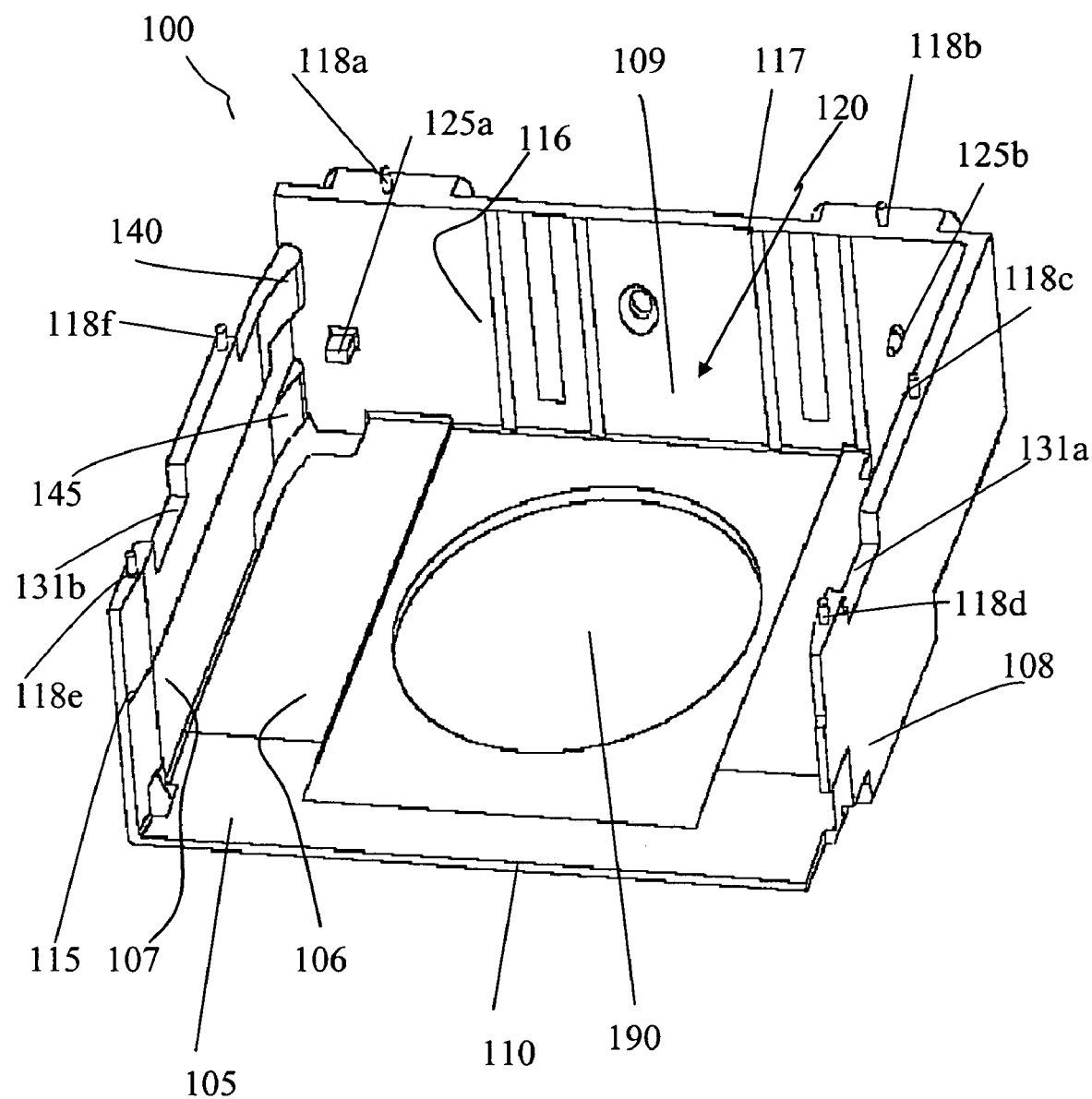
FIG. 1 illustrates an isometric view of an exemplary storage device housing.

Referring to FIG. 1 and according to one aspect illustrated therein, a storage device housing 100 capable of accepting multiple storage device types is provided. The housing 100 includes an exemplary base 105 with an inner base surface 106. Perimeter wall 115 extends from exemplary base 105 along first lateral side 107, second lateral side 108 and rear side 109. Perimeter wall 115 has an inner perimeter surface 116 and extends from base 105 substantially perpendicularly in some aspects. Perimeter wall 115 terminates at top edge 117. Surfaces of portions of housing 100 have been separately identified (e.g., inner base surface 106) at least to indicate that such surfaces may be provided using a variety of different physical designs and vice versa (e.g., base 105 may have a different overall shape).

In some aspects, a height of top edge 117 above inner base surface 106 (i.e., a height of the perimeter wall 115) is sized to a height of a first storage device type. In such aspects, a storage device of the first storage device type inserted from front side 110 into housing 100 may have a top surface that is approximately even with top edge 117 (as further described herein).

In conjunction with inner base surface 106, inner perimeter surface 116 defines an interior space 120 (the space partially enclosed by inner perimeter surface 116 and inner base surface 106). In this example, interior space 120 remains open at front side 110. Housing 100 is illustrated without a cover so that features and elements discussed may be illustrated more effectively; in practice a cover may be disposed at top edge 117. The cover may be secured by pins 118*a-f*. Element numbers used in this figure and other figures may point to only a portion of the entire element referenced (for example, exemplary top edge 117 extends along first lateral side 107, rear side 109, and second lateral side 108, but is only referenced at rear side 109).

Each of base 105 and perimeter wall 115 may be formed as a single piece of material (such as a plastic or a metal) or may be formed from multiple pieces of one or more materials. Also, base 105 and perimeter wall 115 may be formed unitarily (e.g., in a molding process). Further, a portion of base 105 and a portion of perimeter wall 115 may be formed unitarily (e.g., a bisection from a middle of front side 110 to a middle of rear side 109 may be molded separately) and joined with one or more remaining portions of housing 100. Certain features are illustrated in FIG. 1, such as central hole 190 formed in base 105. These features are exemplary of a specific design and may be modified or in some cases eliminated, as one of skill in the art would comprehend. Other features may also be added, such as another hole in perimeter wall 115 or in base 105.

Stand-offs 125*a*, 125*b* are illustrated as protruding from perimeter wall 115 at rear side 109 (i.e., from inner perimeter surface 116 in this aspect). Stand-offs 125*a*, 125*b* may be selected based on which types of storage devices the housing is expected to accommodate. Stand-offs 125*a*, 125*b* may be positioned and shaped for mating or fitting within corresponding notches of a rear wall of a first storage device type and to avoid mating or fitting in notching of a second storage device type, such that stand-offs 125*a*, 125*b* may contact (abut) a rear wall of the second storage device type. Notching may include indentations, holes, slots, cutouts, and the like. Thus, where the first storage device type is longer than the second, stand-offs 125*a*, 125*b* permit the rear wall of the first storage device to be positioned closer to perimeter wall 115, such that both storage device types may be positioned at a comparable pick point relative to front side 110. Stand-offs 125*a*, 125*b* is an example of a length differentiating feature; other designs may be produced, as will be discussed below.

Other features of housing 100 include upper detent 140 and lower detent 145. Each of upper detent 140 and lower detent 145 may be disposed to interact with storage devices of one or more storage device types and may be further disposed to avoid interacting with storage devices of types that interact with the other detent. In other words, upper detent 140 may be disposed to interact with the first storage device type and to avoid interacting with the second storage device type while lower detent 145 may be disposed to interact with the second storage device type and to avoid interacting with the first storage device type. Characteristics of each storage device type may be used to identify one or more appropriate dispositions for each detent. In this example, detent 140 is disposed somewhat closer to rear side 109 than detent 145. Other aspects of the dispositions of detent 140 and detent 145 will become apparent with further reference to other figures.

In some aspects, upper detent 140 and/or lower detent 145 may be modified and respective dispositions selected such that upper detent 140 and/or lower detent 145 may function as a length differentiating feature such that storage devices of the first storage device type and of the second storage device type are disposed at a common pick point (as will be further explicated herein). For such aspects, perimeter wall 115 may have an open rear side, such that housing 100 is shaped like a U with base 105, first lateral side 107, and second lateral side 108.

Exemplary housing 100 also includes indentations 131*a*, 131*b* formed in top edge 117 of perimeter wall 115. A use for these indentations is further discussed herein. Compositions of elements and features discussed above may also be referred to as shells and slot bodies, or names indicative of an intended purpose for housing 100 in a particular library system.

Figure 2:
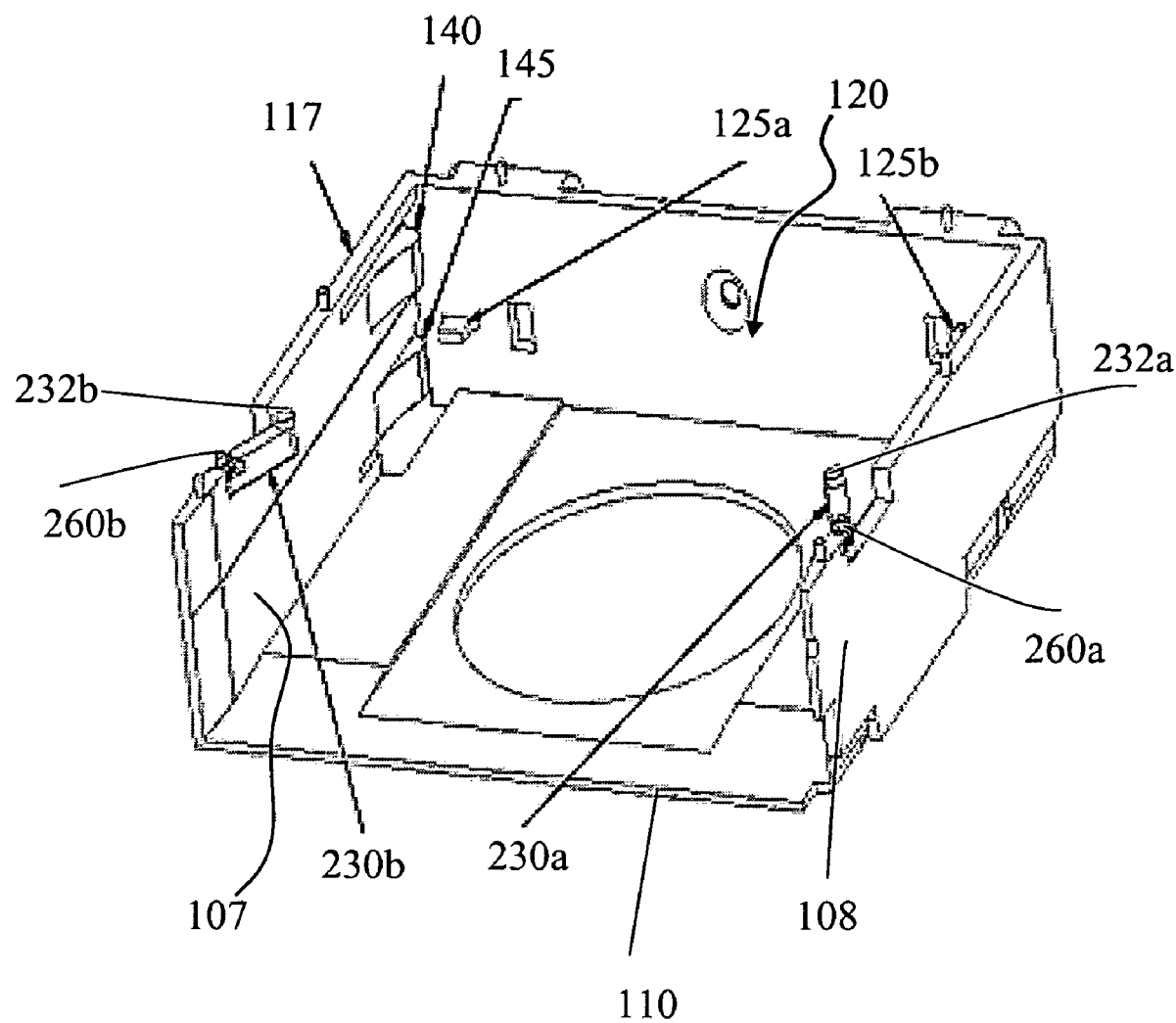
FIG. 2 illustrates an isometric view of the exemplary storage device housing with a feature for adapting the housing to storage devices of different sizes.

Turning to FIG. 2, further storage device type adaptation features are shown and described. Two exemplary arms 230*a*, 230*b* are respectively coupled to perimeter wall 115 in indentations 131*a*, 131*b* formed from top edge 117 and extending from perimeter wall 115. In this example, exemplary arm 230*b* is coupled to first lateral side 107 and arm 230*a* is coupled to second lateral side 108.

As illustrated, arm 230*a* and arm 230*b* are in a biased position, which causes at least an end portion 232*a* of arm 230*a* and an end portion 232*b* of arm 230*b* to extend into a portion of interior space 120. Each arm 230*a*, 230*b* is configured to rotate from the illustrated biased position toward its respective indentation 131*a* and 131*b* (e.g., arm 230*a* is coupled along second lateral side 108 and thus end portion 232*a* of arm 230*a* may rotate toward indentation 131*a* formed in second lateral side 108 and from the portion of interior space 120 which the end portion 232*a* occupies in the biased position).

In some aspects of the invention, each arm 230*a*, 230*b* couples to perimeter wall 115 to locate respective end portion 232*a*, 232*b* at a predetermined height above inner base surface 106. The height of each end portion 232a, 232b is selected based on heights (thicknesses) of storage device types that may be inserted into the housing (i.e., into interior space 120). More particularly, the height of each end portion 232a, 232b above base surface 106 may be selected to match a thickness of a smaller height (thinner) storage device of two storage device types (i.e., selected to match a thinner of two storage devices). Thus, such a thinner storage device would be insertable in housing 100 without pushing on arms 230a, 230b; and if such a thinner storage device were to be inserted, arms 230a, 230b would help secure that thinner storage device by remaining in a biased position over a top surface of the thinner storage device. If a storage device thicker than the thinner storage device were to be inserted, then the thicker storage device would push arms 230a, 230b and as the thicker storage device continued to be inserted, arms 230a, 230b would rotate from interior space 120 in response to the pushing, and permit the thicker storage device to be fully inserted. It is to be understood that if base surface 106 were not flat, one of skill in the art would select a height for end portions 232a, 232b biased on a height differential of the portion upon which a storage device would rest when inserted.

In exemplary FIG. 2, arms 230a, 230b extend substantially parallel to base surface 106 from perimeter wall 115 and arm 230a is biased by torsion spring 260a while arm 230b is biased by torsion spring 260b. In other aspects, each arm 230a and 230b may be coupled to perimeter wall 115 in a window in perimeter wall 115, rather than in indentations 131ab formed in top edge 117. In still other aspects, arms 230a, 230b may be coupled and biased to rotate through a larger arc than illustrated in FIG. 2. By example, if arms 230a, 230b were coupled to perimeter wall as illustrated in FIG. 2, but were biased to extend from perimeter wall 115 towards front side 110 rather than towards rear side 109, end portions 232a, 232b would swing through a greater arc in response to a storage device pushing on each arm 230a, 230b while being inserted from front side 110. Arms 230a, 230b may each also be disposed at some angle with respect to base surface 106. One of skill in the art would understand that other ways to bias arms 230a, 230b other than torsion springs exist, and that torsion spring biasing is merely an example.

In still other aspects of the invention, arms 230a, 230b may be coupled to perimeter wall 115 to rotate in a plane different from described above (substantially parallel to base surface 106). By example, arms 230a, 230b may be adapted to permit loading a storage device from the open top defined on three sides by top edge 117 of perimeter wall 115. Such adaptation would include mounting arms 230a, 230b to rotate from an extended position down towards base 106 and inwards towards the respective portion of perimeter wall 115 to which each arm 230a, 230b is mounted. Upon inserting a storage device from the open top and upon clearing arms 230a, 230b, the arms 230a, 230b would be biased to return to an extended position and thereby aid in securing the storage device in housing 100. Interaction between storage devices of various types and housing 100 will be further described herein.

In further aspects of the invention, arms 230a, 230b may be coupled to a cover disposed at top edge 117 (see above). Arms 230a, 230b may be spring biased into interior space 120 and continue to a predetermined height above inner base surface 106 selected based on heights (thicknesses) of storage device types that may be inserted into the housing (i.e., into interior space 120). The predetermined height may be selected for permitting insertion of a thinner storage device without pushing on arms 230a, 230b. In such aspects, storage devices may be inserted from front side 110. The predetermined height may be further selected so that arms 230a, 230b secure the thinner cartridge in the housing 100 after insertion. A storage device thicker than the thinner storage device, upon insertion would push on arms 230a and 230b, thereby causing them to rotate away from interior space 120 and toward the cover, and permitting the thicker storage device to be fully inserted into the cartridge.

In still further aspects of the invention, an arm may be disposed proximate top edge 117 and substantially parallel to front 110 from first lateral side 107 to second lateral side 108. In such aspects, top edge 117 may be smooth (i.e., without indentations). The arm may be biased by an extension spring for a disposition near front 110, the disposition also providing for insertion of a thinner cartridge without pushing on the arm. Upon insertion of a cartridge thicker than the thinner cartridge, the arm evacuates the interior space 120 by sliding towards rear side 109 upon urging of the thicker cartridge. Extension springs may be provided at top edge 117 at both first lateral side 107 and second lateral side 108. Compression springs may also be used, if disposed to compress towards rear side 109, as one of skill in the art would comprehend. Guide structures may also be formed at top edge 117 or similar location to guide any such springs. In still further aspects, such an arm may also be configured to rotate from the interior space, where the axis of rotation is parallel to front 110. Torsion springs may be disposed at top edge 117 at both first lateral side 107 and second lateral side 108 to bias an arm of such an aspect.

Figure 3:
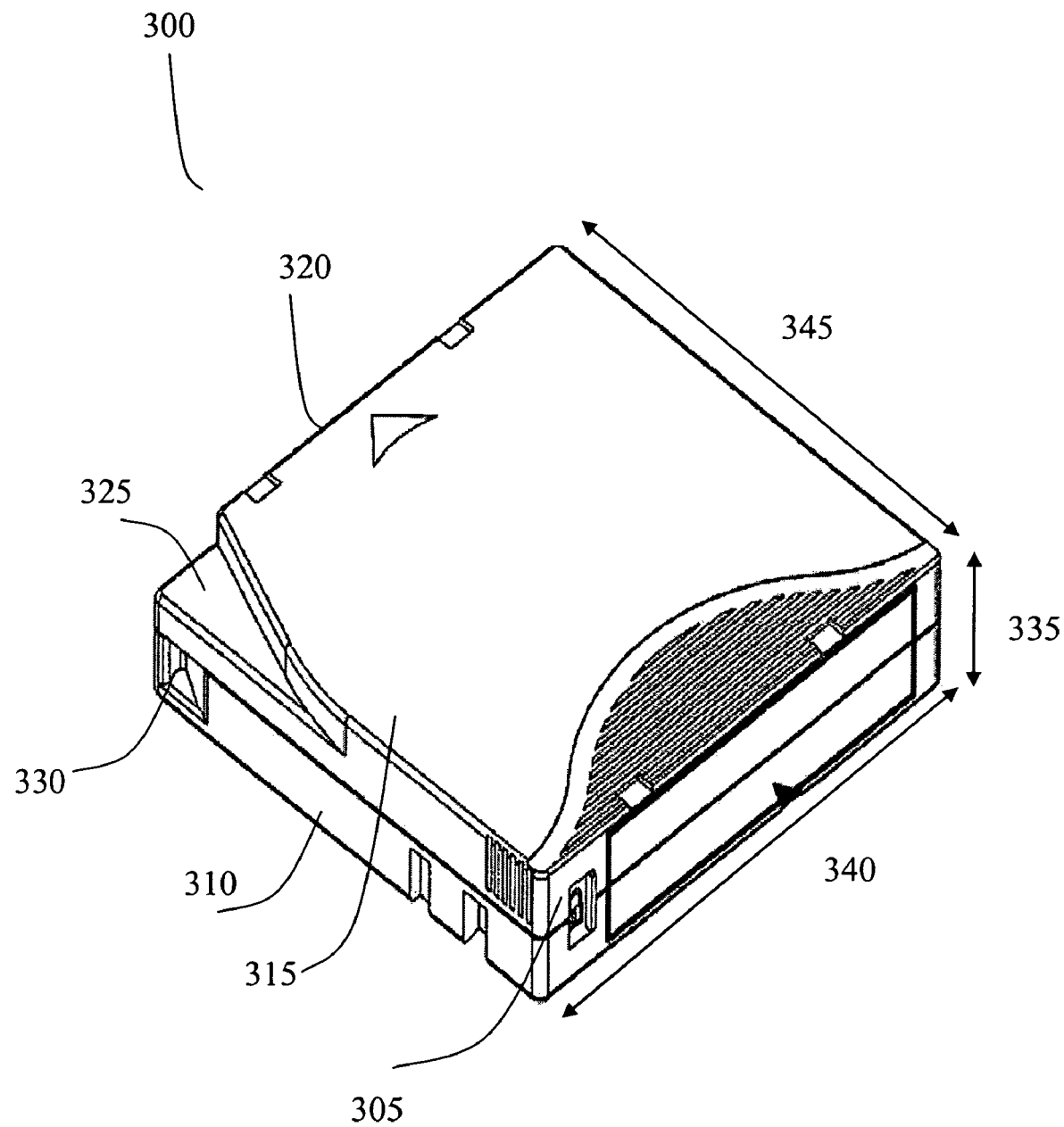
FIG. 3 illustrates a side view of an exemplary cartridge that may be inserted into the exemplary storage device housing.

FIG. 3 illustrates an exemplary first cartridge type 300 (a type of storage device) that may be inserted into housing 100. This cartridge includes certain features useful for illustrating various aspects that may be applied with regard to housing a variety of cartridge types. Cartridge 300 includes front 305, left side 310, top 315, rear 320, cutout 325, and indentation (mating feature) 330. Height 335 (thickness), width 340, and length 345 dimensions of first cartridge type 300 are illustrated. LTO cartridges typically have features of illustrated cartridge type 300.

Figure 4:
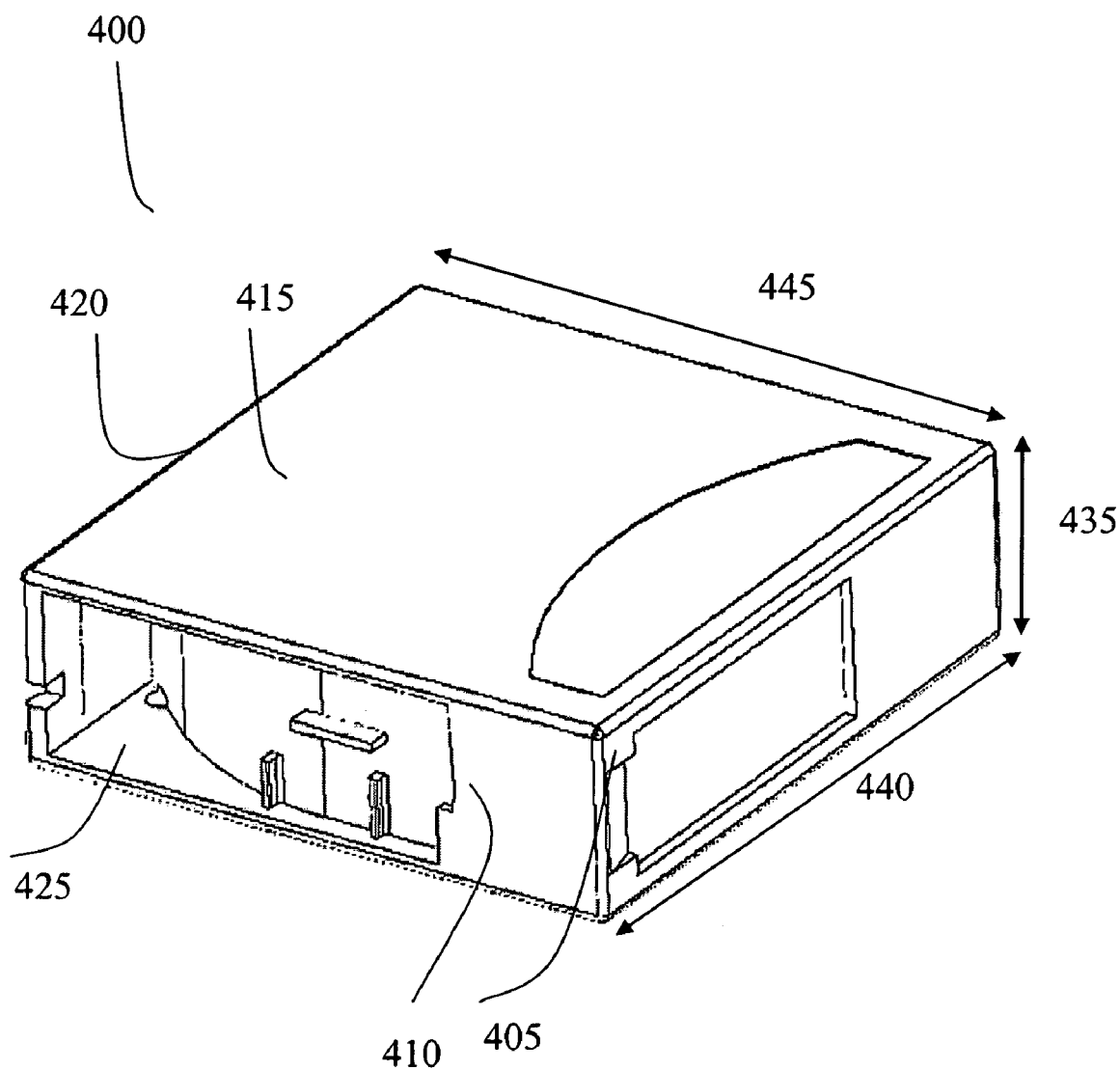
FIG. 4 illustrates a view of another exemplary cartridge that may be inserted into the exemplary storage device housing.

FIG. 4 illustrates an exemplary second cartridge type 400 that may be inserted into housing 100. This cartridge type also includes certain features useful for illustrating various aspects that may be applied in housing a variety of cartridge types. Cartridge 400 includes front 405, left side 410, top 415, rear 420, and cutout (mating feature) 425. Height 435 (thickness), width 440, and length 445 dimensions of second cartridge type 400 are illustrated. As will become apparent, first cartridge type 300 is thinner (smaller in a height dimension) and shorter (smaller in a length dimension) than second cartridge type 400. SDLT cartridges typically have features of illustrated cartridge type 400.

Figure 5:
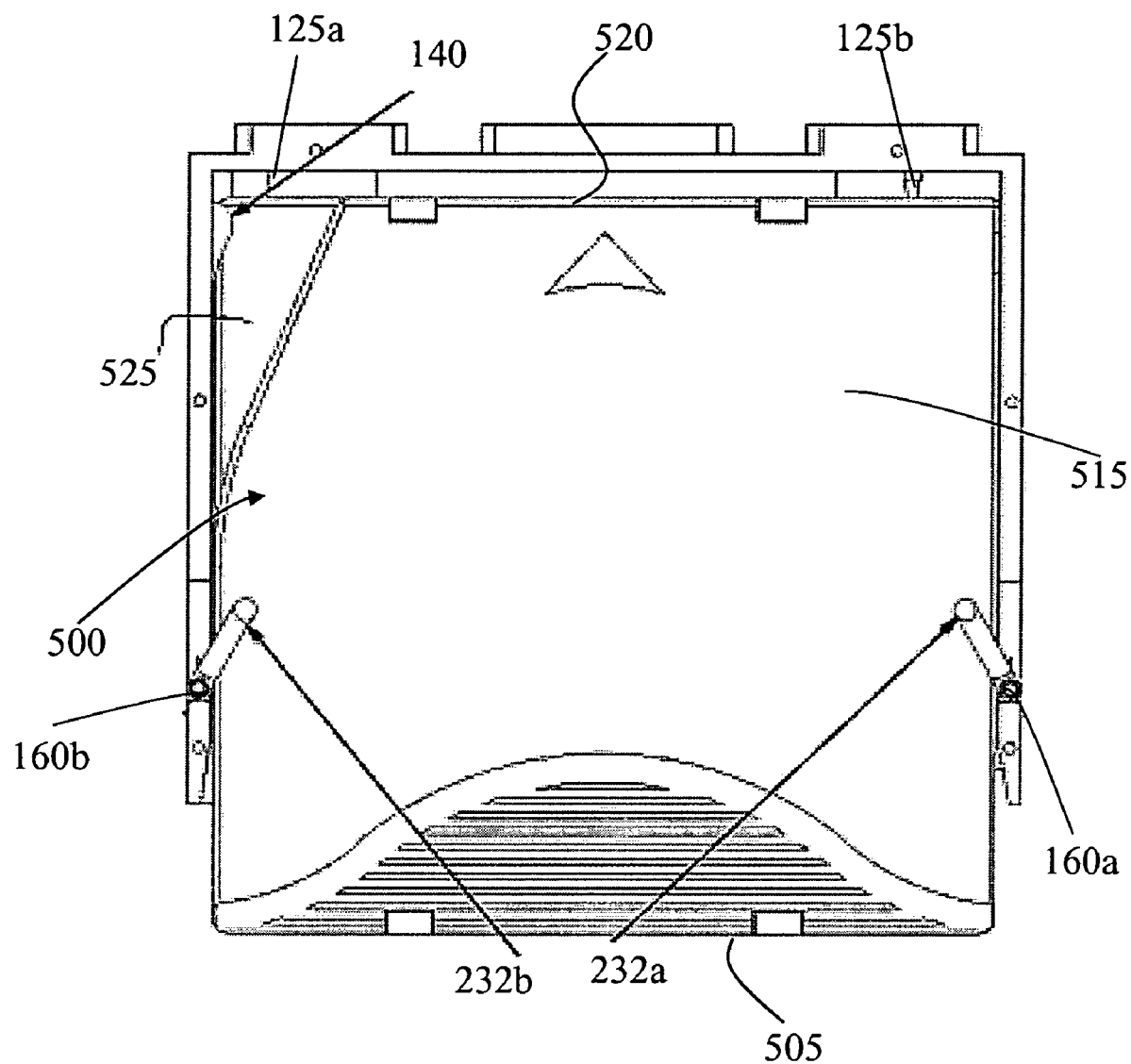
FIG. 5 illustrates a top view of the cartridge housing having inserted therein the cartridge of FIG. 3.

FIG. 5 illustrates a top view of housing 100 having inserted therein a cartridge 500 of first cartridge type 300. Cartridge 500 includes features of cartridge type 300. Some of these features are illustrated and some are obscured by housing 100. One feature visible is cutout 525 (325 for exemplary cartridge type 300). Certain features of housing 100 are also visible while others are obscured. In particular, arm ends 232a and 232b maintain a biased position over top 515 and aid in securing cartridge 500 within housing 100. Also visible are stand-offs 125a, 125b, which keep rear 520 of cartridge 500 a predetermined distance from perimeter wall 115 of housing 100 by resisting against rear 520. Upper detent 140 is visible within cutout 525, while lower detent 145 is within an indentation (corresponding to indentation 330) not illustrated. Thus, upper detent 140 is positioned within cutout 525 and so avoids interaction with cartridge 500.

Figure 6:
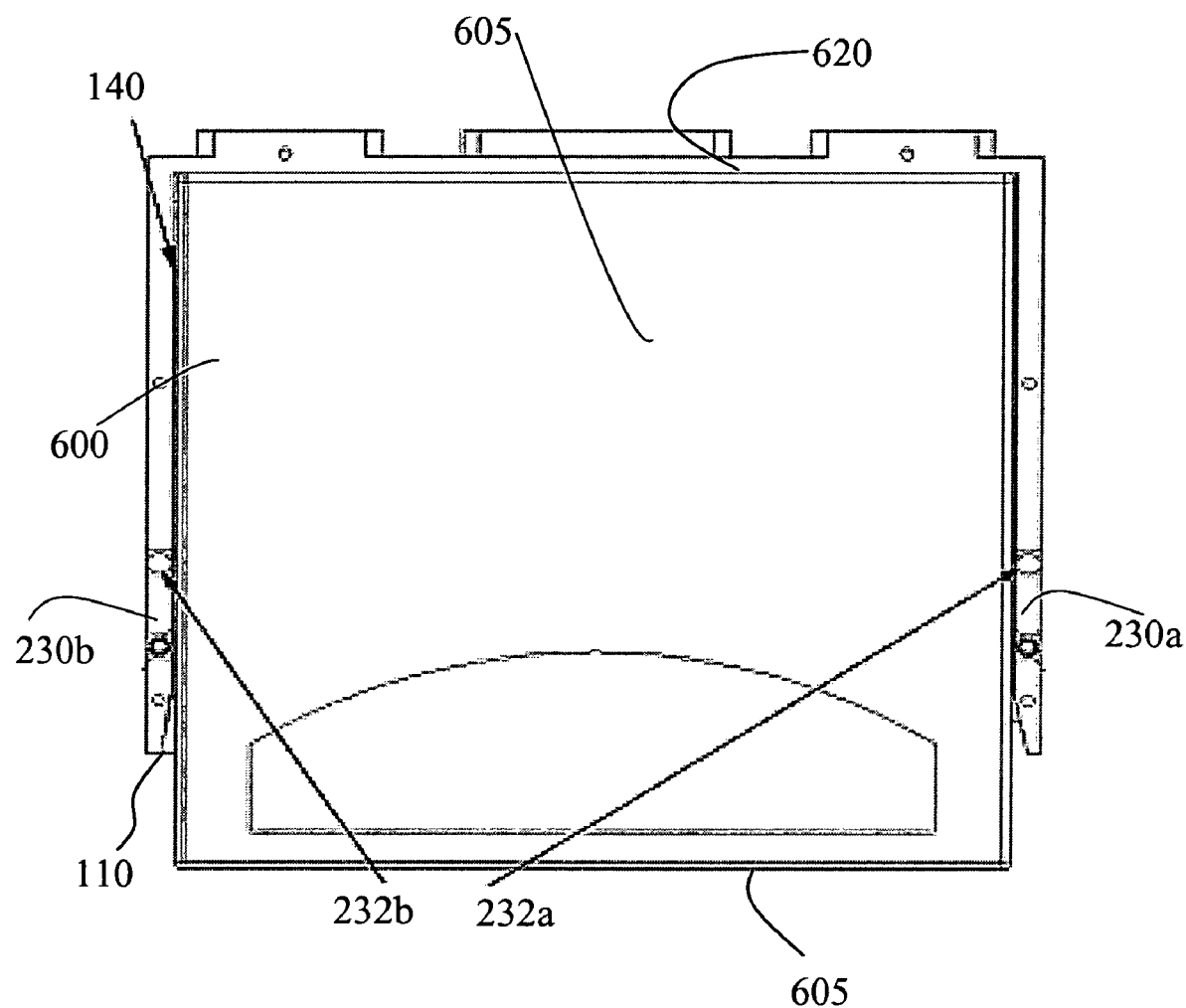
FIG. 6 illustrates a top view of the housing having inserted therein the cartridge of FIG. 4.

FIG. 6 illustrates a top view of housing 100 having inserted therein a cartridge 600 of second cartridge type 400. Cartridge 600 includes aspects of cartridge type 400, some of which are illustrated and some of which are obscured by housing 100. Certain features of housing 100 are also visible while others are obscured. Because cartridge 600 is of exemplary thicker and longer cartridge type 400, aspects relating to stand-offs 125a, 125b are further described here.

In particular, arms 230a, 230b no longer remain biased into interior space 120 but have instead been rotated into respective indentations 131a, 131b (not illustrated in FIG. 6), thereby permitting thicker (taller) cartridge 600 to be inserted into housing 100. Stand-offs 125a, 125b are no longer visible. Stand-offs 125a, 125b, being disposed to match indentations on rear 620 of cartridge 600, do not interfere with cartridge 600 being fully inserted into housing 100, thereby permitting front 505 of cartridge 500 and front 605 of cartridge 600 to be disposed in approximately the same position relative to front 110 of housing 100. In other words, stand-offs 125a, 125b permit a common pick point for cartridges 500 and 600 when inserted into housing 100. The pick point may be defined as a point and a range of points around that point. The pick point may also be defined by a range of points functionally dictated by picking equipment expected to retrieve cartridges from housing 100. For example, if particular picking equipment has ability to tolerate a wider range of cartridge placement, then a pick point may be defined with a greater margin of error.

Upper detent 140 (general location illustrated) is also no longer visible, being obscured by top 605. Upper detent 140 helps secure cartridge 600 in housing 100. Referring to FIGS. 2 and 4, lower detent 145 is disposed at cutout 425 (not illustrated in FIG. 6). Thus, lower detent 145 is disposed to avoid interacting with cartridge 600 while upper detent 140 helps retain cartridge 600 in housing 100. Lower detent 145 may be formed to provide flexibility of movement such that cartridge 600 being inserted into the housing may push lower detent 145 out of the way during insertion. Lower detent 145 may also be formed to fit within a cutout portion of cartridge 600 (of cartridge type 400) such that after cartridge 600 is inserted, lower detent 145 fits within the notch and does not obstruct insertion of cartridge 600. Also, lower detent 145 may be formed with a sufficiently sloping end to permit retrieving cartridge 600 from housing 100 if cartridge 600 is pulled from near its front 605. A sufficient slope of the end provides for lower detent 145 to be pushed away from cartridge 600 as pulling force is applied to cartridge 600 (i.e., lower detent 145 is flexible enough to be pushed out of the way during retrieval of cartridge 600 from housing 100). As discussed above, upper detent 140 and lower detent 145 may be further modified and disposed to provide for disposition of cartridge 500 and cartridge 600 at the pick point, rather than (or in addition to) using a length differentiating feature disposed at rear side 109.

Other modifications and additions to housing 100 would be apparent to those of skill in the art upon referencing the above aspects. For instance, other arms may be disposed at different heights above base surface 106 to accommodate still further variations in thickness among storage device types. Other stand-offs with other lengths may be positioned at other appropriate points on perimeter wall 115 to accommodate still further variations in length among storage device types. Such aspects may also be employed in designing future storage device types to ease compatibility amongst storage device types for storage in a common housing.

Figure 7:
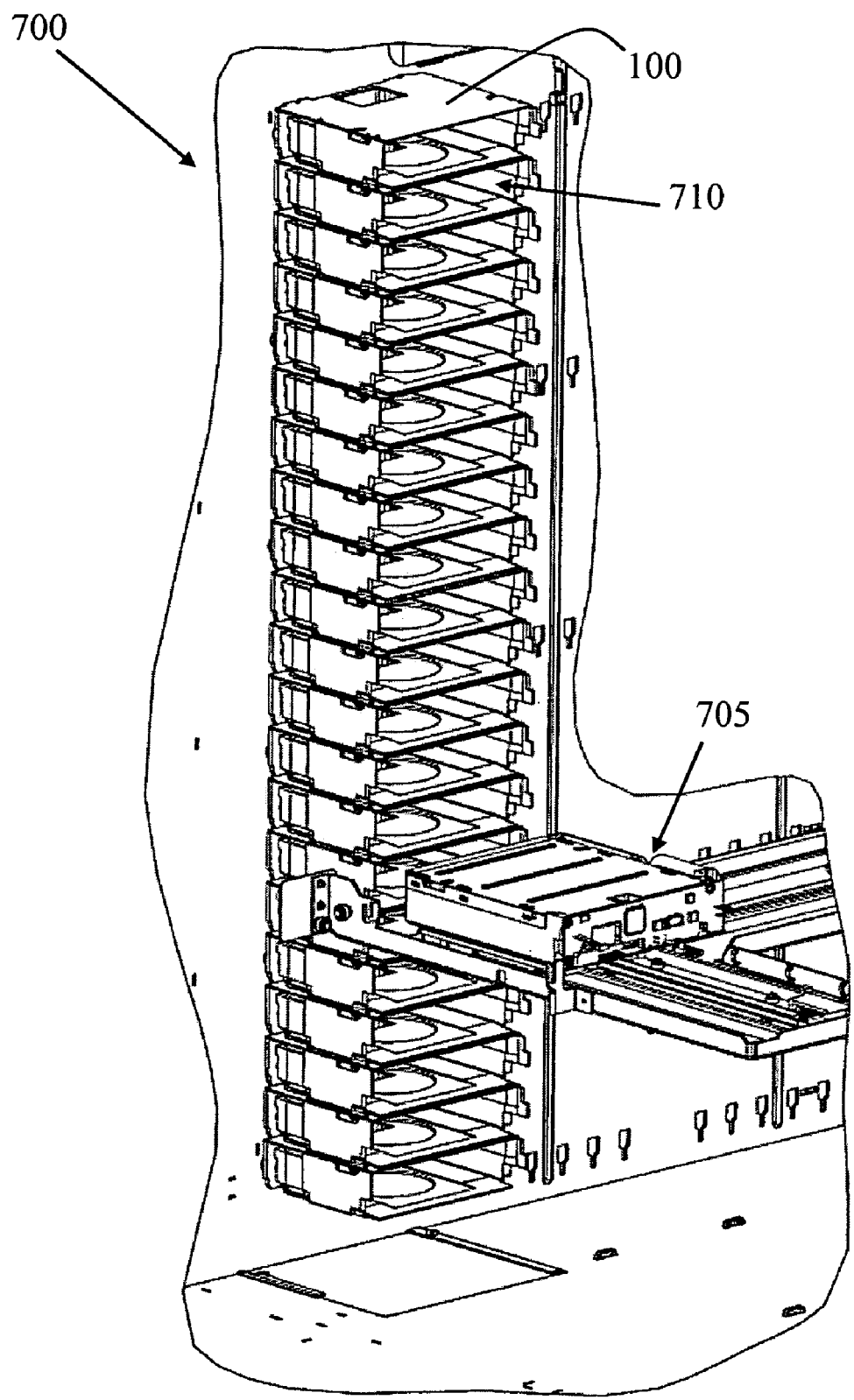
FIG. 7 illustrates an exemplary automated library system portion in which aspects of the exemplary housing may be used.

FIG. 7 illustrates a portion of one of many exemplary systems in which exemplary housing 100 may be used. As illustrated in FIG. 7, housing 100 may be replicated a number of times to provide slots (such as slot 710) for a number of storage devices, such as cartridges 500, 600. By virtue of the aspects described above, slot 710 may accommodate a variety of storage device types. Picker 705 retrieves cartridges 500, 600 (i.e., cartridges of different types stored in housing 100) from slot 710. Because a variety of storage device types may be disposed in any given slot, versatility of system 700 is improved. Housing 100 may be used to provide fixed slots, pass-thrus, pickers and magazines and the like, which are all known by those of skill in the art who would be able to apply aspects described herein to produce universal-type housings useful for all such types. A method for forming a cartridge library system may include providing a plurality of universal housings (e.g., housing 100) in a regular configuration appropriate for a desire library system type (e.g., a magazine), the universal housings having height differentiation features and length differentiating features according to any inventive aspect described above. The method may further include providing cartridge retrieval robotics known in the art appropriate for the desired library system type.

The above detailed description is provided to illustrate exemplary embodiments and is not intended to be limiting. It will be apparent to those of ordinary skill in the art that numerous modification and variations are possible. For example, various arm shapes and configurations, various mechanisms for biasing the arms, and differing and additional placements of such components and mechanisms are possible based on which types of cartridges one of skill in the art wishes to accommodate in a given housing design.

Additionally, particular examples have been discussed and how these examples are thought to address certain disadvantages in related art. This discussion is not meant, however, to restrict the various examples to methods and/or systems that actually address or solve the disadvantages. Accordingly, the present invention is defined by the appended claims and should not be limited by the description herein.

The invention claimed is:

1. A housing for holding-a storage device, comprising:
   a base with at least four sides and an inner base surface;
   a perimeter wall extending from at least two sides of the base and terminating at a top edge, the perimeter wall having an inner perimeter surface, which with the inner base surface defines an interior space; and
   a first arm coupled to the perimeter wall, at least a portion of the first arm biased to extend into the interior space at a predetermined height above the inner base surface,
   wherein the storage device is one of a first and a second storage device type, a height dimension of the first storage device type is smaller than a height dimension of the second storage device type,
   the first arm is configured to evacuate the interior space in response to a storage device of the second storage device type pushing on the first arm during insertion of the storage device into the housing, and
   the predetermined height is selected to allow insertion of the storage device into the housing without the storage device pushing on the first arm if the storage device is of the first storage device type.

2. The housing of claim 1, wherein
   the predetermined height is selected to match the height dimension of the first storage device type, and
   if the storage device is of the first type, the first arm is operable to secure the storage device by remaining in a biased position over a surface of the storage device.

3. The housing of claim 1, wherein the perimeter wall extends along three sides of the base, the sides including a first lateral side, a second lateral side, and a rear side; and further comprising a length differentiating feature extending from the rear side, the length differentiating feature sized and disposed to fit in one or more notches formed in a rear wall of the second type of storage device.

4. The housing of claim 1, further comprising:
a first detent disposed on the perimeter wall for interfacing with a mating feature associated with the first type of storage device and for avoiding interaction with the storage device if the storage device is of the second type; and
a second detent disposed on the perimeter wall for interfacing with a mating feature associated with the second type of storage device and for avoiding interaction with the storage device if the storage device is of the first type.

5. The housing of claim 1, wherein the first type of storage device is an LTO type tape cartridge and the second type of storage device is an SDLT type tape cartridge.

6. The housing of claim 1, wherein the perimeter wall extends along a first lateral side, and a second lateral side, the first arm coupled to the first lateral side; and
further comprising a second arm coupled to the second lateral side.

7. The housing of claim 6, wherein the perimeter wall is unitarily formed with the base.

8. The housing of claim 6, wherein the perimeter wall is formed separately from the base.

9. The housing of claim 6, wherein the perimeter wall is formed from at least two separate pieces.

10. The housing of claim 6, wherein at least a portion of the second arm is biased to extend into the interior space at the predetermined height above the inner base surface, and configured to rotate from the interior space in response to the storage device pushing on the second arm during insertion of the storage device into the housing.

11. The housing of claim 10, wherein the storage device is one of a first and a second storage device type, and a height dimension of the first storage device type is smaller than a height dimension of the second storage device type; and
the predetermined height above the base surface is selected to allow insertion of the storage device into the housing without the storage device pushing on the first or the second arm if the storage device is of the first type.

12. The housing of claim 11, further comprising a length differentiating feature extending from the perimeter wall at a rear side, the length differentiating feature sized and disposed to fit within one or more notches formed in a rear wall of the second type of storage device.

13. The housing of claim 11, further comprising:
a first detent disposed on the perimeter wall for interfacing with a mating feature associated with the first type of storage device and for avoiding interaction with the storage device if the storage device is of the second type; and
a second detent disposed on the perimeter wall for interfacing with a mating feature associated with the second type of storage device and for avoiding interaction with the storage device if the storage device is of the first type.

14. The housing of claim 10, wherein the storage device is one of a first and a second cartridge type, and a length dimension of the first cartridge type is smaller than a length dimension of the second cartridge type, and further comprising a length differentiating feature, the length differentiating feature sized to dispose each of the first and second cartridge types at a predetermined pick point.

15. The housing of claim 14, wherein the first cartridge type is an LTO type tape cartridge and the second cartridge type is an SDLT type tape cartridge.

16. A housing for holding a storage device, comprising:
a base with at least four sides and an inner base surface;
a perimeter wall extending from at least two sides of the base and terminating at a top edge, the perimeter wall having an inner perimeter surface, which with the inner base surface defines an interior space; and
a first arm coupled to the perimeter wall, at least a portion of the first arm biased to extend into the interior space at a predetermined height above the inner base surface and configured to evacuate the interior space in response to a storage device pushing on the first arm during insertion of the storage device into the housing,
wherein the perimeter wall extends along a first lateral side, and a second lateral side, the first arm coupled to the first lateral side; and
further comprising a second arm coupled to the second lateral side
wherein at least a portion of the second arm is biased to extend into the interior space at the predetermined height above the inner base surface, and configured to rotate from the interior space in response to the storage device pushing on the second arm during insertion of the storage device into the housing, and
wherein the storage device is one of a first and a second cartridge type, and a height dimension of the first cartridge type is smaller than a height dimension of the second cartridge type; and the predetermined height above the base surface is selected to allow insertion of the storage device into the housing without the storage device pushing on the first or the second arm if the storage device is of the first cartridge type.

17. A housing for holding a storage device, comprising:
a shell having at least an open front portion, an interior length dimension, and an interior height dimension, the height dimension sized for a height dimension of a first storage device type, and the length dimension sized to dispose a storage device of the first storage device type at a pick point;
a length differentiating feature disposed on the shell for disposing at the pick point a storage device having a length dimension smaller than a length dimension of the first storage device type; and
a first spring biased arm coupled to the shell for securing in the shell a storage device having a height dimension smaller than the height dimension of the first storage device type,
wherein the first arm is operable to extend into the interior space at a predetermined height above an inner base surface of the shell,
the first arm is configured to evacuate the interior space in response to a storage device of the first storage device type pushing on the first arm during insertion of the storage device into the housing, and
the predetermined height is selected to allow insertion of the storage device into the shell without the storage device pushing on the first arm if the storage device has a height dimension smaller than the height dimension of the first storage device type.

18. The housing of claim 17, further comprising:
a first detent disposed on the shell to engage a mating feature associated with the first storage device type and to avoid engaging a mating feature associated with a second storage device type; and
a second detent disposed on the shell to engage the mating feature associated with the second storage device type and to avoid engaging the mating feature associated with the first storage device type.

19. The housing of claim 17, wherein the first spring biased arm is rotatable, and further comprising:

a second spring biased rotatable arm coupled to the shell for further securing in the shell the storage device having the height dimension smaller than the height dimension of the first storage device type.

20. The housing of claim 17, wherein the shell has an open top portion.

21. The housing of claim 17, wherein the shell has an open rear portion.

22. The housing of claim 17, wherein the storage device having the length dimension smaller than the length dimension of the first storage device type and the storage device having the height dimension smaller than the height dimension of the first storage device type are of a second storage device type.

23. A data storage library system, comprising:
   a first housing and a second housing, each of an interchangeable housing type, the interchangeable housing type comprising
   a shell having an interior space with a length dimension and a height dimension, the length dimension and the height dimension respectively sized for a length dimension and a height dimension of a first storage device type; and
   a first arm coupled to the shell and biased to extend at least a portion of the first arm into the interior space at a height above a base of the shell, the height selected to allow insertion of a storage device having a height dimension smaller than the height dimension of the first storage device type into the shell without the storage device pushing on the first arm, the first arm evacuable from the interior space in response to a storage device of the first storage device type pushing on the first arm while being inserted in the shell.

24. The data storage library system of claim 23, wherein the interchangeable housing type further comprises a length differentiating feature extending from the shell at a rear wall, the length differentiating feature sized and disposed to fit within one or more notches formed in a rear wall of the storage device of the first storage device type.

25. The data storage library system of claim 23, wherein the interchangeable housing type further comprises:
   a first detent disposed on the shell at a location selected for interfacing with a mating feature of the storage device of the first storage device type and for avoiding interfacing with a mating feature of a storage device of a second storage device type;
   a second detent disposed on the shell at a location selected for interfacing with the mating feature of the storage device of the second storage device type and for avoiding interfacing with the mating feature of the storage device of the first storage device type.

26. The data storage library system of claim 23, wherein the interchangeable housing type provides one or more of the following types of storage device holder configurations: fixed slot, pass-thru, picker, and magazine.

27. A data storage library system, comprising:
   a first housing and a second housing, each of an interchangeable housing type, the interchangeable housing type comprising
   a shell having an interior space with a length dimension and a height dimension, the length dimension and the height dimension respectively sized for a length dimension and a height dimension of a first storage device type; and
   a first arm coupled to the shell and biased to dispose at least a portion of the first arm in the interior space at a height above a base of the shell, the height selected to secure in the shell a storage device having a height dimension smaller than the height dimension of the first storage device type, the first arm evacuable from the interior space in response to a storage device of the first storage device type pushing on the first arm while being inserted in the shell,
   wherein the first arm is rotatable from the interior space, and further comprising a second arm coupled to the shell and biased to dispose at least a portion of the second arm in the interior space at the height above the base of the shell, the second arm rotatable from the interior space in response to the storage device of the first storage device type pushing on the second arm while being inserted in the shell.

\* \* \* \* \*